Figure 1:
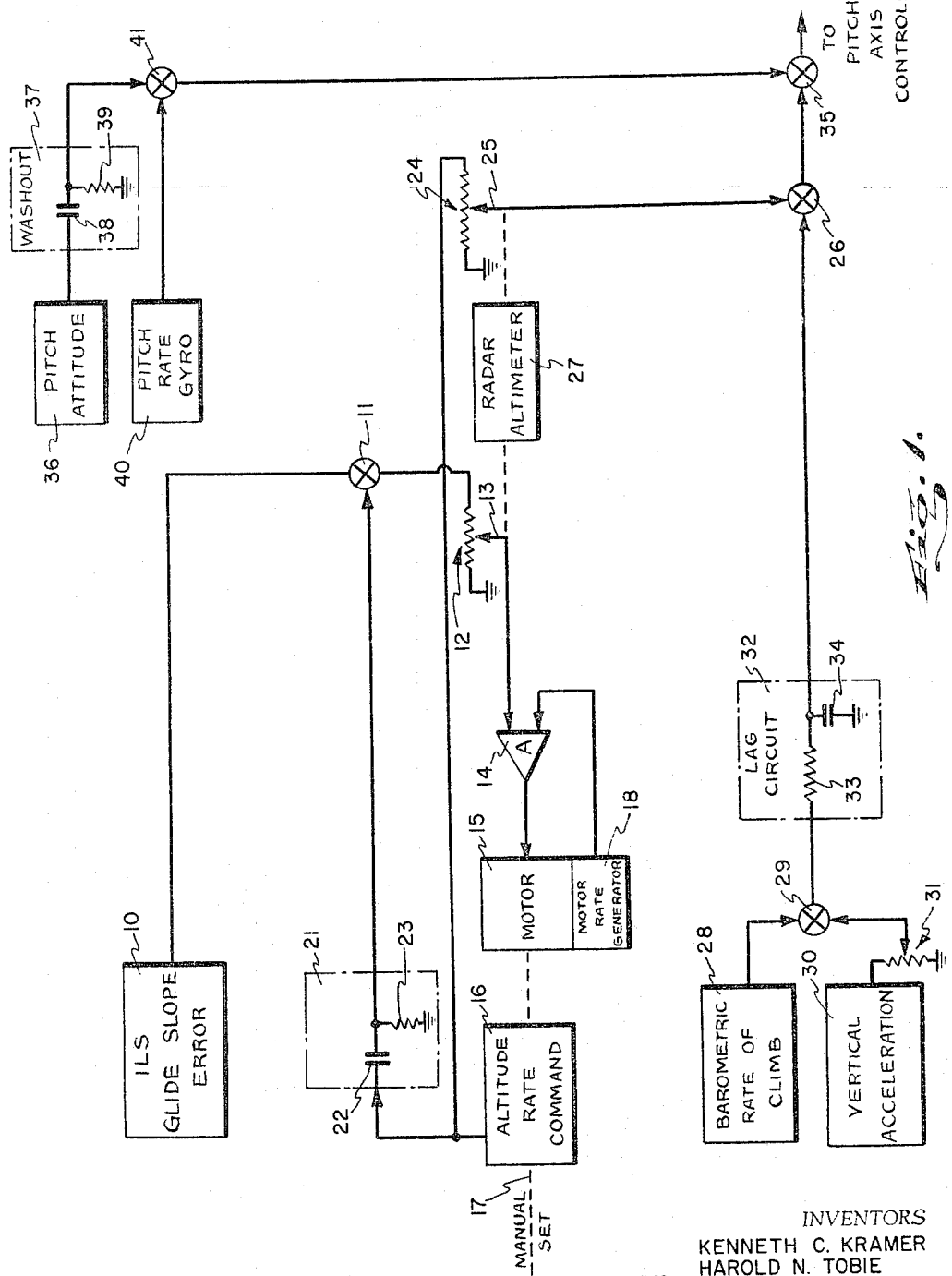

United States Patent Office 3,291,421
Patented Dec. 13, 1966

3,291,421
PITCH CONTROLLER FOR AUTOMATIC LANDING
Kenneth C. Kramer, Woodland Hills, Calif., and Harold N. Tobie, Mercer Island, Wash., assignors to Lear Siegler, Inc., Santa Monica, Calif., a corporation of Delaware
Continuation of application Ser. No. 148,628, Oct. 30, 1961. This application Sept. 29, 1965, Ser. No. 488,665
17 Claims. (Cl. 244—77)

This application is a continuation of application bearing Serial No. 158,628, filed October 30, 1961 by Kenneth C. Kramer and Harold N. Tobie for Pitch Controller for Automatic Landing and assigned to the same assignee.

This invention relates to controls for automatic landing of an aircraft and more particularly to pitch controls for aircraft for automatic landing.

In the present aircraft there are controls which automatically fly the airplane down close to the landing runway. However, at some time prior to the flare out, the pilot is required to take over the controls. The manner in which this semiautomatic landing is accomplished is by using the signals transmitted by a transmitter on the runway to detect the position of the aircraft. The transmitter on the runway transmits electrical signals along a desired beam or flight path of an aircraft in an approach for a landing. The glide slope path is used in conjunction with manual landings in that the error of the aircraft from the center of the glide slope path is displayed on the instrument panel of the aircraft, and the pilot flies the aircraft to diminish the error signal. In the semiautomatic approaches to automatic landings, detectors in the aircraft detect the error of the aircraft from the glide slope path and send the error signal to the aircraft controllers to fly the aircraft back on to the desired glide slope. However, the problem is that the glide slope path method of landing an aircraft can not be accomplished because the glide slope at an altitude of about 100 feet becomes unreliable. Furthermore, the glide slope path follows a straight line down to the runway at a predetermined angle and provides no flare out for the aircraft which is necessary for a safe landing.

It is, therefore, an object of this invention to provide automatic controls for the pitch axis of an aircraft to provide automatic landing.

Another object of the present invention is to provide a system which will use the normal glide slope detection means to a certain point of descent and then to introduce a flare into the aircraft flight path to cause the aircraft to make a safe landing.

A still further object of the present invention is to provide controls for the pitch axis of an aircraft which will automatically cause the aircraft to fly down a glide slope path and flare out prior to landing.

Still another object of the present invention is to provide axis controls for an aircraft which may be used in conjunction with standard autopilot controls to provide a completely automatic landing system for an aircraft.

Another object of the present invention is to provide a system which uses the same coupler for glide path control which is also used for flare with minimum or no switching to ensure that the system is working satisfactorily at time of flare initiation.

Figure 2:
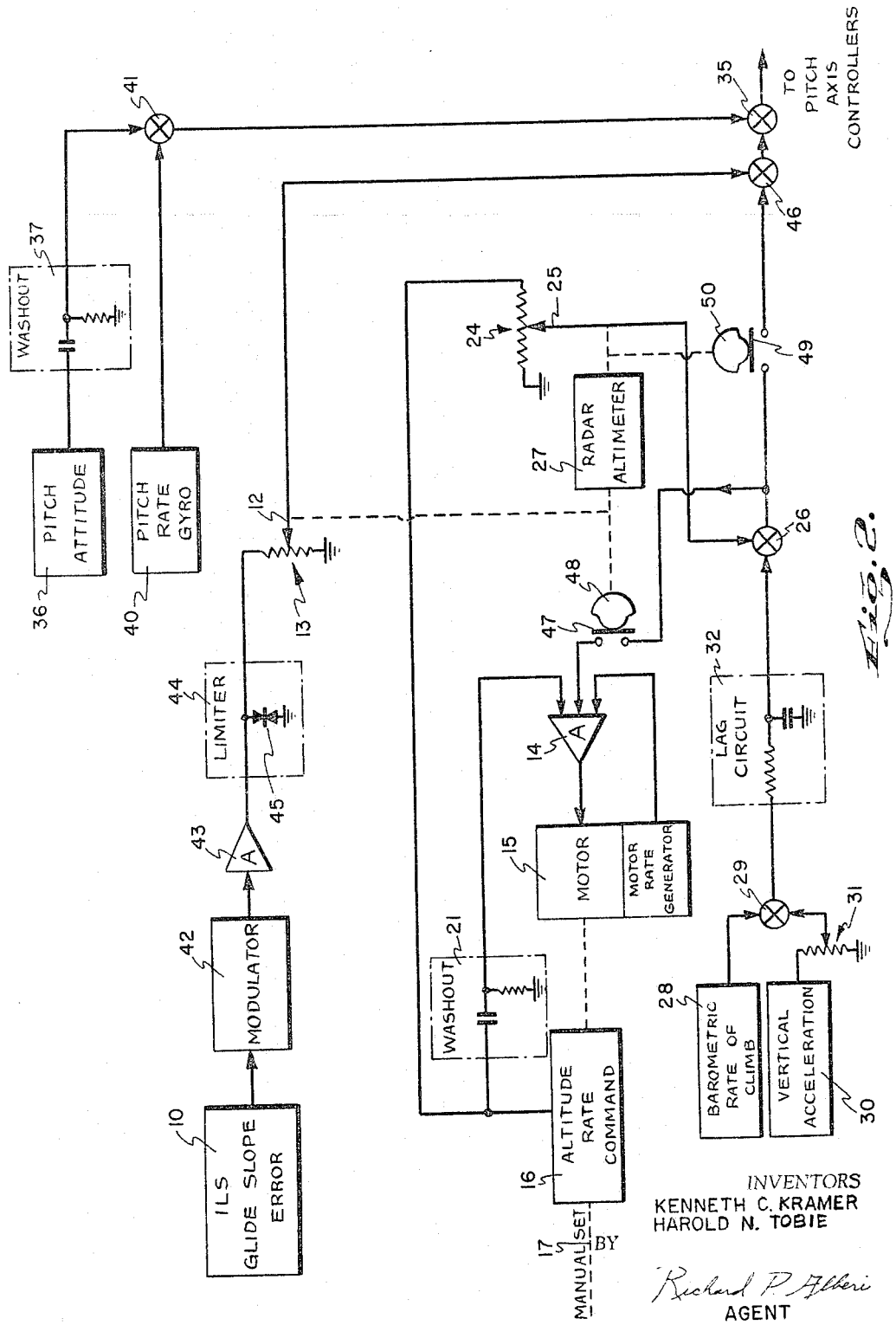
Figure 3:
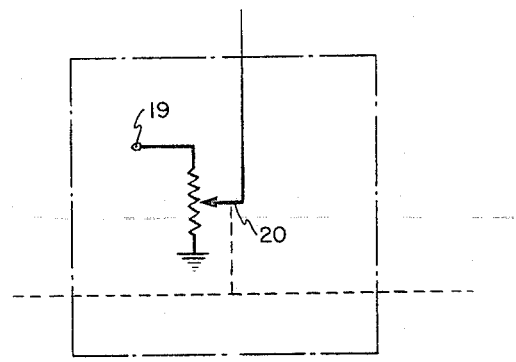
Figure 4:
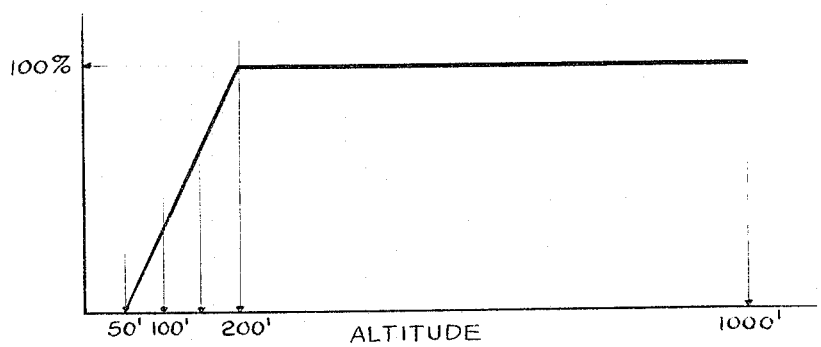
Figure 5:
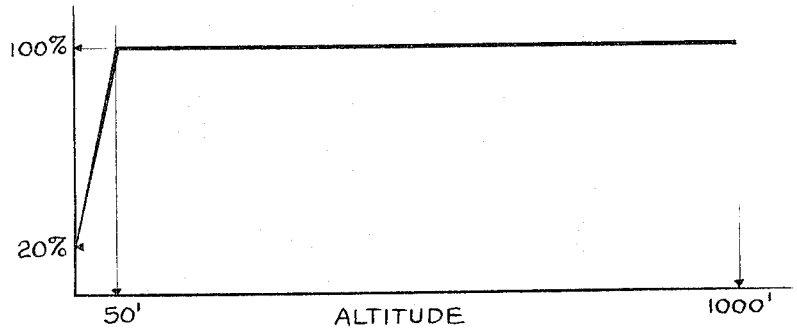

A better understanding of the objects and advantages of the present invention will be had from the drawings in which:

FIG. 1 is a schematic of the present invention;
FIG. 2 is a schematic of the second embodiment of the present invention;
FIG. 3 is a schematic of the altitude rate command unit;
FIG. 4 is a waveform diagram; and
FIG. 5 is a waveform diagram.

DESCRIPTION OF SYSTEM SHOWN IN FIG. 1

Referring to FIGS. 1, 3, 4, and 5 the Instrument Landing System (ILS) glide slope error detector functions in a normal manner, i.e., a transmitter is positioned on the runway which transmits a signal along a desired path of approach to the runway. This path is at some angle to the runway. Normal ILS glide slope error detectors detect this signal and determine the position of the aircraft with respect to the signal and emit an electrical signal proportional to the displacement of the aircraft from the center of the ILS glide slope. The ILS glide slope error detector 10 emits an electrical signal proportional to the displacement of the aircraft from the center of the ILS glide slope beam.

Adder circuit 11 is electrically connected to the output of ILS glide slope error detector 10. Potentiometer 12 has an input electrically connected to the output of adder 11. The wiper arm 13 of potentiometer 12 is electrically connected to one of the inputs to amplifier 14. The output of amplifier 14 drives motor 15. An altitude rate command 16 and motor rate generator 18 are mechanically connected to the output of motor 15. The electrical output of motor rate generator 18 is electrically connected to the other input of amplifier 14. Motor rate generator 18 generates an electrical signal proportional to the rate of turn of motor 15.

The altitude rate command 16 is also manually set by the manual connection 17. The altitude rate command 16, as shown in FIG. 3, can be a simple potentiometer having the wiper arm connected to the motor 15. A potential is applied to terminal 19 and the wiper arm 20 is mechanicaly connected to the output of motor 15 and also mechanically connected to the manual set input 17. An electrical connection to the wiper arm 20, FIG. 3, constitutes the output of the altitude rate command 16. Washout circuit 21 is electrically connected to the output of the altitude rate command 16. A typical washout circuit 21 comprises a capacitor 22 and a resistor 23. It is to be noted that any other circuit performing the same function as the washout may be used in place of the washout circuit 21 shown in FIG. 1. The capacitor 22 and resistor 23 function in the normal manner to wash out any steady state (low frequency) voltage which comes from the wiper arm 20 of the altitude rate command 16. At higher frequencies the washout will pass the voltage which in turn acts as a position feedback signal on the altitude rate command 16, servo positioning loop. The output of the washout circuit 21 is electrically connected to the adder circuit 11. The output of the altitude rate command 16 is also electrically connected to the input of the potentiometer 24. The wiper arm 25 of potentiometer 24 is electrically connected to the adder circuit 26.

A radar altimeter 27 is mechanicaly connected to the wiper arm 13 of potentiometer 12 and also to the wiper arm 25 of potentiometer 24. The radar altimeter operates to turn the output shaft as a function of altitude. Consequently, the radar altimeter determines the gain of the potentiometers 12 and 24. A barometric rate of climb detector 28 has an electrical output electrically connected to the adder circuit 29.

The barometric rate of climb detector 28 emits an electrical signal in the normal fashion as a function of the rate of climb of the aircraft. A vertical acceleration detector 30 emits an electrical signal proportional to the vertical acceleration of the aircraft. The output of the vertical acceleration detector 30 is electrically connected to the adder circuit 29 by way of the manually set potentiometer 31. The outut of the adder circuit 29 is electrically connected to the input of the lag circuit 32. A typical lag circuit 32 comprises a resistor 33 and a capacitor 34. The lag circuit 32 filters the signal from adder circuit 29, i.e., the capacitor 34 operates to smooth the signal from the adder circuit 29 in the normal manner.

The output of the lag circuit 32 is electrically connected to the adder circuit 26. Adder circuit 35 is electrically connected to the output of adder circuit 26. The output of the adder circuit 35 is electrically connected to the pitch axis controllers. The output of adder circuit 35 can go through a standard autopilot since this system is merely controlling the pitch axis of the aircraft and the controls for the other axes of the aircraft are present in the autopilot. However, the output of adder circuit 35 can go directly to the pitch axis servos with the autopilot functioning to control the remainder of the axes of the aircraft.

A pitch attitude detector 36 emits an electrical signal proportional to the pitch attitude of the aircraft; such pitch attitude detectors are well known in the art. The output of the pitch attitude detector 36 is electrically connected to the washout circuit 37. A typical washout circuit 37 comprises a capacitor 38 and a resistor 39, similar to the washout circuit 21. The washout circuit 37 functions the same as the washout circuit 21, i.e., to washout standing voltages emitted by the pitch attitude detector 36. A pitch rate gyroscope 40 emits an electrical signal proportional to the rate of pitch of the aircraft. Pitch rate gyroscope detectors are also well known in the art. The output of the washout circuit 37 and the pitch rate gyroscope 40 are electrically connected to the adder circuit 41. Adder circuit 35 is electrically connected to the output of the adder circuit 41.

OPERATION OF THE SYSTEM SHOWN IN FIG. 1

In order to understand the operation of the system shown in FIG. 1, it should first be noted that the radar altimeter 27 positions the wiper arms 13 and 25 of the potentiometers 12 and 24, respectively. As shown in FIG. 4 the gain of the potentiometer 12 is at 100% until the radar altimeter senses a predetermined altitude of approximately 200 feet at which time the gain of potentiometer 12 decreases steadily to zero, which is approximately 50 feet of altitude. Therefore, the signal from adder circuit 11 is allowed to pass 100% to amplifier 14 until the aircraft reaches an altitude of approximately 200 feet, at which time the signal from adder circuit 11 to amplifier 14 is slowly diminished until at the altitude of approximately 50 feet, the signal from adder circuit 11 is not allowed to pass to amplifier 14. However, the potentiometer 24 is set up so that the gain of the potentiometer 24 is at a maximum until the aircraft reaches the flare altitude of approximately 50 feet of altitude, at which time the gain diminishes until the gain reaches a minimum of 20%. The 20% gain of potentiometer 24 is maintained until the aircraft actually lands (see FIG. 5).

When the aircraft enters the glide slope path emitted by the transmitter on the ground, the system shown in FIG. 1 is engaged either manually or automatically by means well known in the art. The ILS glide slope error detector emits an electrical signal through the adder circuit 11 which is proportional to the displacement of the aircraft from the glide slope path center with regard to altitude. If there is an error and the aircraft is above 200 feet, the error is allowed to pass through the adder circuit 11 through the potentiometer 12 and into the amplifier 14. The motor 15 is then driven by the amplifier 14.

Prior to entering the glide slope path, the glide slope is generally known. It may be for example three degrees with respect to the horizontal runway. The descent of an aircraft, for example, ten feet per second can be estimated which will maintain the aircraft approximately in the glide path center. The manual set 17 is turned so that the output of the altitude rate command 16 is an electrical signal which if allowed to pass to the pitch axis controllers of the aircraft, would maintain the aircraft in an attitude to give a descent of ten feet per second. Due to wind conditions and variations in aircraft speed and glide slope angle, such a programmed flight is impossible. Therefore, the output of the altitude rate command 16 is modified as will be shown later.

Assume for the moment that the altitude rate command signal is not being modified. The signal from the altitude rate command passes to the potentiometer 24, and when the aircraft is more than 50 feet in altitude, the signal passes directly to the adder circuit 26 through the adder circuit 35 and on to the pitch axis controllers. But since the altitude rate command 16 has no means of sensing whether or not the aircraft has been blown by a gust of wind or a thermal activity in the air, the ILS glide slope error signal passes through adder circuit 11, potentiometer 12 and amplifier 14 to motor 15 to drive the altitude rate command 16 so as to emit a larger or smaller signal depending upon whether the aircraft is above or below the center of the glide path beam. In this manner the output of the altitude rate command 16 is modified.

The output of the altitude rate command 16 also passes to the washout circuit 21 and on to the adder circuit 11 so that when the output of the altitude rate command 16 is changed sufficiently to compensate for the error indicated by the ILS glide slope error detector 10, the output of the ILS glide slope error detector 10 is cancelled in the adder circuit 11 by the instantaneous voltage coming out of the washout 21. Further electrical output is received by the amplifier 14 and motor 15 until the washout 21 reduces the steady state voltages from the altitude rate command 16 to zero. Thereafter, the output of the altitude rate command 16 remains constant until a further error is detected by the ILS glide slope error detector.

With the altitude rate command 16 emitting a constant signal, then unless the signal is damped out, the pitch axis controllers would continuously demand more and more pitch from the aircraft. Therefore, the barometric rate of climb indicator 28 emits an electrical signal which is added to the output of the potentiometer 24 in adder circuit 26 to partially damp the electrical signal from the potentiometer 24. It is to be noted that the barometric rate of climb signal must pass through a lag circuit to be filtered. Since filters inherently have a time delay due to the capacitor 34, the signal from the barometric rate of climb 28 is delayed and would be out of phase with the output of the potentiometer 24 were it not for the vertical acceleration signal from the vertical acceleration detector 30.

A vertical acceleration signal is, by its very nature, approximately 90 degrees out of phase with a rate of climb signal. Therefore, the potentiometer 31 is manually set as a function of the time constant of the capacitor 34. The effect of this is that the phase of the barometric rate of climb signal is set back due to the lag circuit 32, but in the adder circuit 29 a portion of the vertical acceleration signal is added to it to compensate for this lag. The vertical acceleration signal advances the phase of the signal from the barometric rate of climb detector 28 by an amount equal to that by which the phase is delayed in the lag circuit 32.

The output of the adder circuit 41 is a further means of damping the oscillations of the aircraft. When the altitude rate command 16 commands a given pitch attitude, the pitch attitude indicator 36 emits an electrical signal proportional to the pitch attitude of the aircraft. Therefore, when there is an output from the adder circuit 26 which is not equal and opposite to the output of the adder circuit 41, the pitch axis controllers are actuated. It can now be seen that an aircraft approaching a landing runway and having means to automatically control the pitch axis controllers when the aircraft enters the glide slope path, makes an automatic landing with regard to the pitch axis of the aircraft in the following manner. When the aircraft is above 200 feet, the gains on both potentiometers 12 and 24 are at 100 percent and allows the full signal to pass through the potentiometers. The altitude rate command detector emits a signal to the potentiometer 24, commanding a given rate of descent. The ILS glide slope error detector, detects any displacement of the aircraft from the glide path center and emits a signal proportional thereto. The signal from the ILS glide slope error detector passes through potentiometer 12 and on to drive motor 15 to reposition the altitude rate command 16. When the output of the washout 21 equals the output of the ILS glide slope error detector 10, then there is no output from the adder circuit 11, and the output of the altitude rate command 16 is constant and goes directly through the potentiometer 24 to the adder circuit 26.

The output of the adder circuit 26 passes through the adder circuit 35 and on to control the pitch axis controllers of the aircraft. However, the signal from the barometric rate of climb indicator 28 is used to damp the output of the potentiometer 24, and the signal from the adder circuit 41 is used to further damp the output of the adder circuit 26.

The altitude rate command commands that the aircraft fly along a given slope, however, if the aircraft is off the glide slope beam, then the ILS glide slope error detector commands that the aircraft take a modified rate of descent to get it back on to the center of the glide slope beam. The barometric rate of climb indicator and the pitch attitude 36, and the pitch rate gyroscope 40 function to damp out the correction signal so that the aircraft does not overcontrol. For example, without the barometric rate of climb signal, the aircraft would continually pitch more and more until it performed a full loop, which is, of course, undesirable in a landing maneuver. The barometric rate of climb signal prevents such action of the aircraft. The pitch attitude and rate gyroscope signal from adder circuit 41 sense the return of the aircraft and emit an electrical signal to further counteract the pitch axis control signal.

The system functions as just stated above, until the aircraft reaches an altitude of 200 feet, at which time the information from the ILS glide slope error detector 10 becomes somewhat unreliable, and, therefore, the gain of the potentiometer 12 is diminished to limit the capability of the ILS glide slope error detector. At 50 feet of altitude the gain of potentiometer 12 is virtually zero and the ILS glide slope error detector has no effect on the system.

At 50 feet the gain of potentiometer 24 starts to diminish, but only diminishes to 20 percent, and the flare maneuver is started. The reason for this is that the output of the altitude rate command is a steady state signal without the correction of the ILS glide slope detector and, therefore, without some means of modifying the output of the altitude rate command signal below 50 feet, the aircraft would fly a straight line into the runway. However, by modifying the output of the potentiometer 24 starting at an altitude of 50 feet the gain of the potentiometer 24 diminishes slowly so that instead of commanding a 10 feet per second descent, the descent command signal slowly diminishes causing the aircraft to flare out. However, if the altitude rate command should reach zero and if the runway had a slight downslope the aircraft might "hang" some few feet above the runway and fail to complete the landing, but the gain of potentiometer 24 does not reach zero and, therefore, it commands a small percent, that is, 20 percent of the ten feet per second to be fed into the pitch axis. This means that the aircraft cannot "hang" above the runway even if the runway has a slight downslope.

This system when used with a standard autopilot to control the lateral displacement of the aircraft, the yaw axis of the aircraft, and the speed of the aircraft provides for a completely automatic landing of the aircraft.

DESCRIPTION OF SYSTEM SHOWN IN FIG. 2

The system shown in FIG. 2 functions similar to the system shown in FIG. 1 but has some modifications thereof. The first modification is that the output of the ILS glide slope error detector 10 does not go to the adder circuit 11, but passes to a modulator 42 where the signal is modulated and passed to an amplifier 43, and on to a limiter 44. A typical limiter 44 is shown as a double zener diode 45. The double zener diode 45 acts to suppress any signal above a given magnitude and to allow any signal below a given magnitude to pass through the limiter 44. The output of limiter 44 is connected to adder circuit 46 by way of the arm 13 of potentiometer 12. Switch 47 is operated by a cam 48. The cam 48 is mechanically connected to the radar altimeter 27. The cam 48 is mechanically connected to the switch 47, to actuate the switch 47. It can be seen that as the radar altimeter moves cam 48, the switch is actuated by the cam at some predetermined altitude, thus the switch 47 is opened.

Another modification made in FIG. 2 is that the output of the washout 21 does not go to the adder circuit 11 but goes directly to the input of amplifier 14. The input to the switch 47 comes from the output of the adder circuit 26.

A further modification is the switch 49 positioned between the adder circuit 26 and the adder circuit 46. The switch 49 is operated by the cam 50, which is mechanically connected to the radar altimeter 27. The cam 50 functions the same way as the cam 48.

OPERATION OF THE SYSTEM SHOWN IN FIG. 2

The operation of the system shown in FIG. 2 is similar to that shown in FIG. 1 with some exceptions. The signal from the lag circuit 32 is still added to the output of the potentiometer 24 and adder circuit 26. This signal is the damping signal referred to in the operation of the system shown in FIG. 1. The output of the pitch attitude detector 36 and the pitch rate gyroscope 40 still goes to the adder circuit 35 to further damp the control signal to the pitch axis controllers. The radar altimeter 27 will modifies the gain of the potentiometers 12 and 24. However, the output of radar altimeter 27 also operates the cams 48 and 50. It is to be noted that the switch 47 is normally closed and the switch 49 is normally opened. With the altitude above 200 feet, the signal from the ILS glide slope error detector 10 is passed through the modulator 42, where it is modulated in the normal fashion, through the amplifier 43 and on to the limiter 44. If the signal is below the given magnitude it passes on to the adder circuit 46 through potentiometer 12. The limiter 44 merely requires that the error signal be small enough to prevent an appreciable error from the glide slope path center passing through the pitch axis controller, which might cause the aircraft to assume a dangerous pitch attitude while on the glide slope path, when a small displacement from the glide slope path center is not detrimental to the control of the aircraft. In other words, only that portion of the error signal which does not exceed a predetermined maximum, is allowed to pass through the limiter circuit 44. The damping signal from adder 41, when switch 47 is closed and switch 49 opened, is added to the signal from the limiter 44 and the result is passed to the pitch axis controllers to control the pitch of the aircraft. The signal from the adder circuit 41 functions as described above to damp the signal from the ILS glide slope error detector 10. The cam 48 is set such that when the radar altimeter indicates that the aircraft is at an altitude of 200 feet, the cam 48 opens switch 47. But at the same time the cam 50 is also in a position to close switch 49.

Therefore, until the aircraft descends to an altitude of 200 feet, the ILS glide slope error detector is maintaining the aircraft on the center of the ILS glide slope beam. But at 200 feet the ILS glide slope error detector starts reducing to zero by action of potentiometer 12 and the signal from the potentiometer 24 and lag circuit 32 is allowed to pass to the adder circuit 35 and on to the pitch axis controllers to control the pitch axis of the aircraft. When the switch 49 is opened, the output of the altitude rate command passes to the potentiometer 24 and since the switch 49 is open, the aircraft is above 200 feet in altitude and, therefore, the gain of potentiometer 24 is 100 percent and the full signal is allowed to pass to another added circuit 26. The output of the lag circuit 32 is added to the output of the potentiometer 24 and the output of the adder circuit 26 passes to the closed switch 47. Any difference in the output of potentiometer 24 and the output of the lag circuit 32 causes an input to the amplifier 14, which in turn drives motor 15 and repositions the altitude rate command so that it is synchronized with the barometric rate of climb. When the aircraft has descended to 200 feet the switch 49 is closed and the error signal, that is the difference between the output of the potentiometer 24 and the lag circuit 32 is only passed to the adder circuit 35 and on to the pitch axis controllers so that the aircraft is controlled basically by the altitude rate command signal as modified by the glide path signal from potentiometer 12. The modification by the glide path error signal is reduced from 100 percent at 200 feet to zero at 50 feet by potentiometer 12.

The system shown in FIG. 2 functions the same as the system shown in FIG. 1 when the aircraft is below 50 feet, with the exception that the ILS glide slope error detector 10 is at zero. The reason for reducing to zero the ILS error detector 10 below 50 feet is that again the information from an ILS glide scope error detector, when the aircraft is below 50 feet, is unreliable. But since as described above in the description of the operation of the system shown in FIG. 1, the ILS glide scope error detector signal is effectively cut off anyway by the potentiometer 12. The system shown in FIG. 2 functions basically the same as the system shown in FIG. 1 except that the ILS error detector 10 goes directly to the pitch axis controllers, while the altitude rate error out of adder circuit 26 causes motor 15 to reposition the altitude rate command 16 to obtain zero output at adder circuit 26. This is a modified means of synchronizing the altitude rate command output. Both systems provide a means for sensing the displacement of the aircraft with regard to altitude from the center of the glide slope path and controlling the aircraft so as to bring it back into the center of the glide slope path while the aircraft is above 200 feet, and both systems provide for an automatic means to flare the aircraft out prior to touch down of the aircraft on the runway.

The present invention when used in conjunction with automatic controls to automatically control the other axes of an aircraft and when used in conjunction with an instrument landing system transmitter positioned on a landing runway, controls the pitch axis of an aircraft so that the aircraft flies down the center of the glide slope beam and then flares out prior to actual landing of the aircraft.

The present invention has been found to work very satisfactorily when used as indicated above.

Although this invention has been particularly described above, it is not intended that it should be limited by the above description, but only in accordance with the spirit and scope of the appended claims.

We claim:
1. Automatic landing approach control system for aircraft which is used in conjunction with a transmitting means located on a landing area for providing electrical signals along a desired path, comprising:
 (a) means in said aircraft for emitting a first electrical signal for controlling said aircraft about the pitch axis, said first electrical signal being proportional in magnitude to the vertical deviation of said aircraft from said desired path,
 (b) controlled variable signal means to emit a second electrical signal to control said aircraft about the pitch axis,
 (c) means to detect the altitude of said aircraft, and
 (d) potentiometer means responsive to said altitude detection means to progressively modify the effect of said first and second signals on the pitch axis control of said aircraft.

2. The device as claimed in claim 1 and further comprising: altitude rate of change measuring means emitting an electrical signal proportional to the rate of descent of said aircraft to counteract the effect of said first and second signals on the pitch axis of said aircraft.

3. The device as claimed in claim 1 wherein said potentiometer means begins to progressively decrease said first electrical signal when said aircraft reaches a given altitude and continues to decrease said first electrical signal until it reaches a value of substantially zero when said aircraft reaches a second predetermined given altitude, lower than said first mentioned given altitude.

4. Automatic landing approach control system for aircraft which is used in conjunction with a transmitting means located on a landing area for providing electrical signals along a desired path, comprising:
 (a) means in said aircraft for emitting a first electrical signal for controlling said aircraft about the pitch axis, said first electrical signal being proportional in magnitude to the vertical deviation of said aircraft from said desired path,
 (b) means to emit a second electrical signal to control said aircraft about the pitch axis,
 (c) means to detect the altitude of said aircraft, and
 (d) modifying means responsive to said altitude detection means to progressively modify the effect of said first and second signals on the pitch axis control of said aircraft,
 (e) means emitting a third electrical signal proportional to the rate of descent of said aircraft, first adding means to add said first, second, and third electrical signals such that said third electrical signal opposes said first and second electrical signals,
 (f) means emitting a fourth electrical signal proportional to the pitch attitude of said aircraft,
 (g) means emitting a fifth electrical signal proportional to the rate of pitch of said aircraft,
 (h) second adding means to add said fourth and fifth electrical signals, and
 (i) third adding means to add the output of said first adding means with the output of said second adding means, such that the output of said second adding means opposes the output of said first adding means.

5. Automatic pitch control system for aircraft which is used in conjunction with a transmitting means located on a landing area for providing electrical signals along a desired path, comprising:
 (a) means in said aircraft for emitting a first electrical signal for controlling said aircraft about the pitch axis, said first electrical signal being porportional in magnitude to the vertical deviation of said aircraft from said desired path,
 (b) means for emitting a second electrical signal to control the pitch axis of said aircraft so as to make said aircraft move about the pitch axis of said aircraft and thereby maintain a desired descent of said aircraft,
 (c) altitude sensing means to disconnect said first signal,
 (d) detection means to detect the rate of descent of said aircraft and emit a third electrical signal proportional thereto,
 (e) means to emit a fourth electrical signal proportional to the combined pitch attitude and pitch rate of said aircraft, and
 (f) means to add said first, second, third, and fourth electrical signals such that said third and fourth electrical signals oppose said first and second electrical signals.

6. Automatic landing approach control system for aircraft which is used in conjunction with a transmitting means located on a landing area for providing electrical signals along a desired path, comprising:
   (a) means in said aircraft for emitting a first electrical signal for controlling said aircraft about the pitch axis, said first electrical signal being proportional in magnitude to the vertical deviation of said aircraft from said desired path,
   (b) means to emit a second electrical signal to control said aircraft about the pitch axis,
   (c) means to detect the altitude of said aircraft, and
   (d) modifying means responsive to said altitude detection means to progressively modify the effect of said first and second signals on the pitch axis control of said aircraft,
   (e) a first potentiometer electrically connected to receive said first electrical signal, said potentiometer being responsive to said means to detect the altitude of said aircraft so as to vary the gain of said potentiometer,
   (f) means responsive to the electrical output of said first potentiometer to vary said second electrical signal, and
   (g) a second potentiometer electrically connected to receive said second electrical signal, said second potentiometer being responsive to said means to detect the altitude of said aircraft to vary the gain of said second potentiometer, the electrical output of said second potentiometer being the electrical signal to control the pitch axis of said aircraft.

7. The device as claimed in claim 6 and further comprising:
   (a) means emitting a third electrical signal proportional to the rate of descent of said aircraft,
   (b) means emitting a fourth electrical signal proportional to the pitch attitude of said aircraft,
   (c) means emitting a fifth electrical signal proportional to the rate of pitch of said aircraft, and
   (d) adding means electrically connected to add said third, fourth, and fifth electrical signals to the output of said second potentiometer such that said third, fourth, and fifth electrical signals oppose said output of said second potentiometer, the output of said adding means being the electrical signal to control the pitch axis of said aircraft.

8. Automatic pitch control system for aircraft which is used in conjunction with a transmitting means located on a landing area for providing electrical signals along a desired path comprising:
   (a) means in said aircraft for emitting a first electrical signal for controlling said aircraft about the pitch axis, said first electrical signal being proportional in magnitude to the vertical deviation of said aircraft from said desired path,
   (b) means to emit a second electrical signal to control said aircraft about the pitch axis,
   (c) means to detect the altitude of said aircraft,
   (d) a first potentiometer electrically connected to receive said first electrical signal, said potentiometer being responsive to said means to detect the altitude of said aircraft so as to vary the gain of said potentiometer,
   (e) means responsive to the electrical output of said first potentiometer to vary said second electrical signal, and
   (f) a second potentiometer electrically connected to receive said second electrical signal, said second potentiometer being responsive to said means to detect the altitude of said aircraft to vary the gain of said second potentiometer, the electrical output of said second potentiometer being the electrical signal to control the pitch axis of said aircraft.

9. Automatic landing approach control system for aircraft which is used in conjunction with a transmitting means located on a landing area for providing electrical signals along a desired path, comprising:
   (a) means in said aircraft for emitting a first electrical signal for controlling said aircraft about the pitch axis, said first electrical signal being proportional in magnitude to the vertical deviation of said aircraft from said desired path,
   (b) means to emit a second electrical signal to control said aircraft about the pitch axis,
   (c) means to detect the altitude of said aircraft, and
   (d) modifying means responsive to said altitude detection means to progressively modify the effect of said first and second signals on the pitch axis control of said aircraft,
   (e) a first potentiometer electrically connected to receive said first electrical signal, said first potentiometer being responsive to said means to detect the altitude of said aircraft to vary the gain of said first potentiometer,
   (f) a second potentiometer being electrically connected to receive said second electrical signal, said second potentiometer being responsive to said means to detect the altitude of said aircraft to vary the gain of said second potentiometer,
   (g) means responsive to the output of said second potentiometer to vary said second electrical signal, and
   (h) adding means electrically connected to add the output of said first potentiometer and said second potentiometer, the electrical output of said adding means being the electrical signal to control said aircraft about the pitch axis.

10. The device as claimed in claim 9 and further comprising:
   (a) means emitting a third electrical signal proportional to the rate of descent of said aircraft,
   (b) means emitting a fourth elecrical signal proportional to the pitch attitude of said aircraft,
   (c) means emitting a fifth electrical signal proportional to the rate of pitch of said aircraft, and
   (d) adding means electrically connected to add said third, fourth, and fifth electrical signals to the output of said second potentiometer such that said third, fourth, and fifth electrical signals oppose said output of said second potentiometer, the output of said adding means being the electrical signal to control the pitch axis of said aircraft.

11. Automatic pitch control system for aircraft which is used in conjunction with a transmitting means located on a landing area for providing electrical signals along a desired path, comprising:
   (a) means in said aircraft for emitting a first electrical signal for controlling said aircraft about the pitch axis, said first electrical signal being proportional in magnitude to the vertical deviation of said aircraft from said desired path,
   (b) means to emit a second electrical signal to control said aircraft about the pitch axis,
   (c) means to detect the altitude of said aircraft,
   (d) a first potentiometer electrically connected to receive said first electrical signal, said first potentiometer being responsive to said means to detect the altitude of said aircraft to vary the gain of said first potentiometer,
   (e) a second potentiometer being electrically connected to receive said second electrical signal, said second potentiometer being responsive to said means to detect the altitude of said aircraft to vary the gain of said second potentiometer,
   (f) means responsive to the output of said second potentiometer to vary said second electrical signal, and
   (g) adding means electrically connected to add the output of said first potentiometer and said second potentiometer, the electrical output of said adding means being the electrical signal to control said aircraft about the pitch axis.

12. Automatic landing approach control system for aircraft which is used in conjunction with a transmitting means located on a landing area for providing electrical signals along a desired path, comprising:
(a) means in said aircraft for emitting a first electrical signal for controlling said aircraft about the pitch axis, said first electrical signal being proportional in magnitude to the vertical deviation of said aircraft from said desired path,
(b) means to emit a second electrical signal to control said aircraft about the pitch axis,
(c) means to detect the altitude of said aircraft, and
(d) means responsive to said altitude detection means for progressively modifying the effect of said first and second signals on the pitch axis control of said aircraft.

13. Automatic landing approach control system for aircraft which is used in conjunction with a transmitting means located on a landing area for providing electrical signals along a desired path, comprising:
(a) means in said aircraft for emitting a first electrical signal for controlling said aircraft about the pitch axis, said first electrical signal being proportional in magnitude to the vertical deviation of said aircraft from said desired path,
(b) controlled variable signal means to emit a second electrical signal to control said aircraft about the pitch axis,
(c) means to detect the altitude of said aircraft, and
(d) means responsive to said altitude detection means for progressively modifying the effect of said first and second signals on the pitch axis control of said aircraft.

14. Automatic landing approach control system for aircraft which is used in conjunction with a transmitting means located on a landing area for providing electrical signals along a desired path, comprising:
(a) means in said aircraft for emitting a first electrical signal for controlling said aircraft about the pitch axis, said first electrical signal being proportional in magnitude to the vertical deviation of said aircraft from said desired path,
(b) progressively modifiable signal means to emit a second electrical signal to control said aircraft about the pitch axis,
(c) means to detect the altitude of said aircraft, and
(d) means connected to said altitude detection means and said first and second signal emitting means and responsive to said altitude detection means for progressively modifying the effect of said first and second signals on the pitch axis control of said aircraft.

15. Automatic landing approach control system for aircraft which is used in conjunction with a transmitting means located on a landing area for providing electrical signals along a desired path, comprising:
(a) means in said aircraft for emitting a first electrical signal for controlling said aircraft about the pitch axis, said first electrical signal being proportional in magnitude to the vertical deviation of said aircraft from said desired path,
(b) means to emit a second electrical signal to control said aircraft about the pitch axis,
(c) means to detect the altitude of said aircraft,
(d) first signal modifying means connected to said first signal emitting means and responsive to said altitude detection means when said aircraft reaches a first predetermined altitude for thereafter progressively decreasing said first electrical signal to substantially a zero value when said aircraft reaches a second and lower predetermined altitude, and
(e) second signal modifying means connected to said second signal emitting means and responsive to said altitude detection means when said aircraft reaches said second predetermined altitude for thereafter progressively decreasing said second electrical signal to a finite predetermined value which is maintained until touchdown of said aircraft on said landing area.

16. In an automatic landing approach control system for aircraft for use with a glide path signal provided along the desired path of approach to a runway by transmitter means located at the runway,
(a) first control means responsive to the glide path signal for controlling the pitch of the aircraft to cause the aircraft to follow the glide path,
(b) means for progressively reducing to substantially zero the effect of the glide path signal on the pitch of the aircraft as the aircraft descends below a first predetermined altitude, and
(c) second control means independent of said first control means and said signal reducing means, and responsive to the altitude of the aircraft for progressively modifying the pitch angle of the aircraft during the terminal portion of approach to a runway to provide flareout for the aircraft.

17. In an automatic landing approach control system for aircraft for use with a glide path signal provided along the desired path of approach to a runway,
(a) means responsive to the glide path signal for providing a first electrical signal for controlling the pitch of the aircraft to cause the aircraft to follow the glide path,
(b) means for progressively changing the first electrical signal when the aircraft descends below a first predetermined altitude to progressively reduce the effect of the glide path signal on the pitch of the aircraft as the aircraft descends, and
(c) means for providing a second electrical signals which varies in accordance with the altitude of the aircraft when the aircraft descends below a second predetermined altitude to progressively modify the pitch angle of the aircraft during the final portion of approach to a runway to provide flareout for the aircraft.

References Cited by the Examiner

UNITED STATES PATENTS

| | | | |
|---|---|---|---|
| 2,439,044 | 4/1948 | Ferrill | 343—108 |
| 2,830,291 | 4/1958 | Hecht | 244—77 |
| 2,841,345 | 9/1958 | Halpert | 244—77 |
| 2,987,275 | 6/1961 | Moncrieff-Yeates | 244—77 |
| 3,015,459 | 1/1962 | McLane | 244—77 |
| 3,032,756 | 5/1962 | Tull et al. | 244—77 |

FERGUS S. MIDDLETON, *Primary Examiner.*